US007015907B2

(12) United States Patent
Tek et al.

(10) Patent No.: US 7,015,907 B2
(45) Date of Patent: Mar. 21, 2006

(54) SEGMENTATION OF 3D MEDICAL STRUCTURES USING ROBUST RAY PROPAGATION

(75) Inventors: Huseyin Tek, Princeton, NJ (US); Dorin Comaniciu, Princeton, NJ (US); James P. Williams, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 251 days.

(21) Appl. No.: 10/234,271

(22) Filed: Sep. 4, 2002

(65) Prior Publication Data
US 2003/0197704 A1      Oct. 23, 2003

Related U.S. Application Data

(60) Provisional application No. 60/373,684, filed on Apr. 18, 2002.

(51) Int. Cl.
G06T 17/20        (2006.01)
(52) U.S. Cl. ................... 345/423; 345/419; 345/426; 345/427; 345/581; 345/583; 345/589; 345/621; 382/128; 382/173
(58) Field of Classification Search ............... 345/423, 345/424, 426, 589, 583, 419, 427, 581, 621, 345/622, 421; 382/128, 173
See application file for complete search history.

(56) References Cited

U.S. PATENT DOCUMENTS 6,385,332 B1 *   5/2002  Zahalka et al. ............. 382/128
6,785,409 B1 *   8/2004  Suri .......................... 382/128

FOREIGN PATENT DOCUMENTS

EP           1030187 A      8/2000

OTHER PUBLICATIONS

Comaniciu et al. "Mean Shift Analysis and Application", IEEE published Sep. 20-27, 1999, pp. 1-8.*

(Continued)

Primary Examiner—Kimbinh T. Nguyen
(74) Attorney, Agent, or Firm—Donald B. Paschburg; F CHau & Associates LLC

(57) ABSTRACT

A method for segmentation of 3D structures in CT and MR images is provided. The method is based on 3D ray propagation by mean-shift analysis with a smoothness constraint. Ray propagation is used to guide an evolving surface due to its computational efficiency and shape priors are incorporated for robust convergence. The method includes the steps of receiving 3D image data; visualizing the 3D image data on a display device; selecting a structure in the 3D image data by placing a seed in the structure; initializing a plurality of rays from the seed to form a surface; determining a speed function of each of the rays; evolving the surface by propagating the rays based on the speed function of each of the rays; converging the rays on a boundary of the structure; and segmenting the structure when all of the rays have converged on the structure's boundary.

16 Claims, 3 Drawing Sheets

OTHER PUBLICATIONS

Lakare S et al: "3D digital cleansing using segmentation rays" Proceedings Visualization 2000. VIS 2000 (Cat. No. 00CH37145), Salt Lake City, UT, USA, Oct. 8-13, 2000, pp. 37-44, 538, XP002271797 2000, Piscataway, NJ USA, IEEE, USA sections 3 and 6 abstract.

Tek H et al: "Vessel detection by mean shift based ray propagation" Workshop on Mathematical Methods in Biomedical Image Analysis, Kauai, Hi, USA, Dec. 9-10, 2001. pp. 228-235, XP002271798 2001, Los Alamitos, CA, USA IEEE Comput. Soc, USA ISBN: 0-7695-1336-0 the whole document.

Dorin Comanici and Peter Meer, "Mean Shift: a Robust Approach Toward Feature Space Analysis" IEEE Transactions On Pattern Analysis and Machine Intelligence, vol. 24., No. 5., May 2002, pp. 1-18.

* cited by examiner

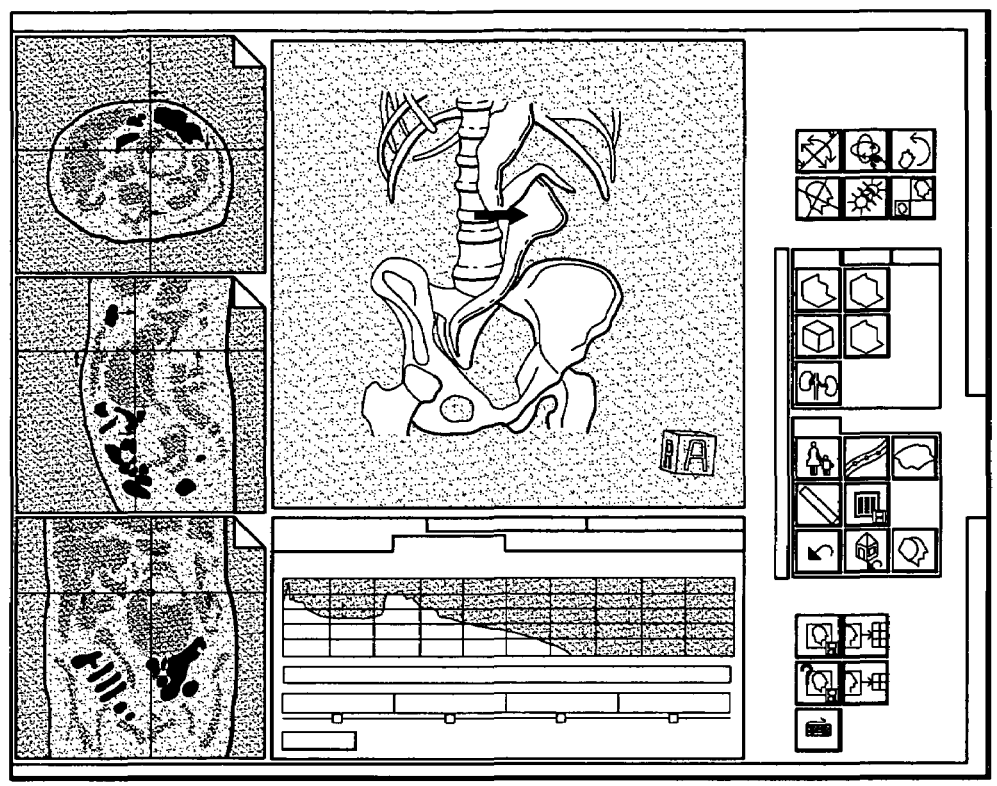
FIG. 1(a)
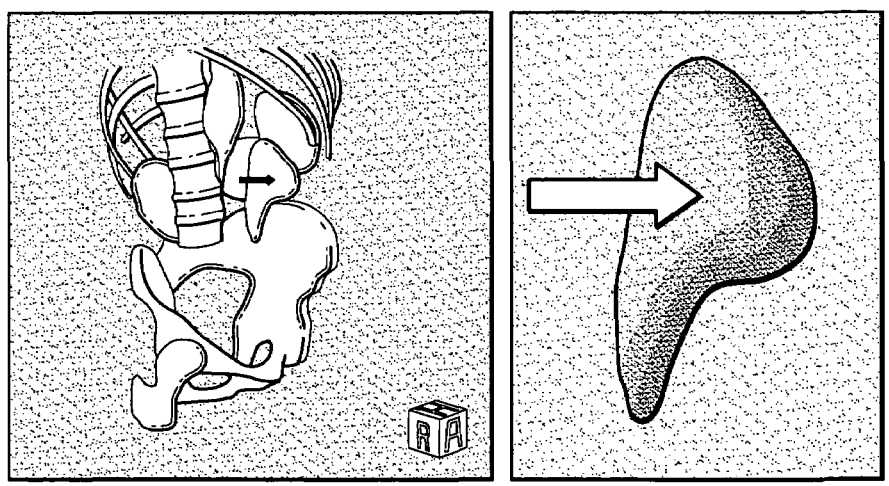
FIG. 1(b)     FIG. 1(c)

SEGMENTATION OF 3D MEDICAL STRUCTURES USING ROBUST RAY PROPAGATION

CROSS REFERENCE TO RELATED APPLICATION

The present application claims priority to U.S. Provisional Patent Application Ser. No. 60/373,684, filed Apr. 18, 2002, which is hereby incorporated by reference.

BACKGROUND OF THE INVENTION

1. Field of the Invention

The present invention relates generally to computer vision and imaging systems, and more particularly, to a system and method for segmentation of 3D medical structures, e.g., organs, aneurysms and brain tumors, using robust ray propagation.

2. Description of the Related Art

The segmentation of three-dimensional (3D) structures in CT (computerized tomography) and MR (magnetic resonance) images is an inherently difficult and time consuming problem. The accurate localization of object surfaces is influenced by the presence of significant noise levels, generated through partial-volume effects and by image acquisition devices. In addition, the processing in 3D space implies an increased computational complexity, which makes impractical the 3D extension of most two-dimensional (2D) segmentation algorithms.

Deformable models have been popular for segmentation of 3D medical images. These approaches can produce good segmentation results if the initialization is done properly. In general, deformable models work well if they are initialized close to object boundaries and if they are almost symmetrically away from boundaries. However, such initialization of deformable models is typically a difficult task because a 3D model must be created inside 3D data by using a 2D display device. In addition, the current deformable model approaches are computationally expensive. This is due to the additional dimension in the case of level set methods, or expensive reinitialization of parameters in the case of explicit surface evolution techniques.

SUMMARY OF THE INVENTION

A robust and efficient method for segmentation of 3D structures in CT and MR images is provided. The method is based on 3D ray propagation by mean-shift analysis with a smoothness constraint. Ray propagation is used to guide an evolving surface due to its computational efficiency. In addition, non-parametric analysis and shape priors are incorporated to the method for robust convergence.

According to one aspect of the present invention, a method for segmenting structures from three-dimensional (3D) images is provided. The method including the steps of receiving 3D image data; visualizing the 3D image data on a display device; selecting a structure in the 3D image data by placing a seed in the structure; initializing a plurality of rays from the seed to form a surface; determining a speed function of each of the plurality of rays; evolving the surface by propagating the plurality of rays based on the speed function of each of the plurality of rays; converging the plurality of rays on a boundary of the structure; and segmenting the structure when all of the plurality of rays have converged on the structure's boundary. The method further includes the step of determining a volume of the segmented structure.

According to another aspect of the invention, the evolving the surface step of the method includes performing a mean-shift analysis on each of the plurality of rays to identify image discontinuities, the image discontinuities defining the structure's boundary. Furthermore, the performing a mean-shift analysis includes the steps of determining a joint spatial-intensity domain for each of the plurality of rays, the joint spatial-intensity domain including for each pixel along each of the plurality of rays at least one location value and at least one intensity value; partitioning the domain to identify the discontinuities based on a probability density; and determining a displacement vector for each of the plurality of rays, the displacement vector being a spatial distance between a point on an individual ray and a discontinuity on the individual ray, wherein if the displacement vector of the individual ray is greater than a predetermined value, the speed of the individual ray is increased, and if the displacement vector of the individual ray is less than the predetermined value, the speed of the individual ray is decreased.

According to an additional aspect of the invention, the evolving the surface step of the method includes applying a smoothness constraint to the evolving surface. The applying a smoothness constraint includes filtering the speed function of an individual ray of the plurality of rays based on a neighboring ray and imposing a mean curvature on the evolving surface based on shape priors.

According to a further aspect of the present invention, a program storage device readable by a machine, tangibly embodying a program of instructions executable by the machine to perform method steps for segmenting structures from three-dimensional (3D) images includes the method steps of receiving 3D image data; visualizing the 3D image data on a display device; selecting a structure in the 3D image data by placing a seed in the structure; initializing a plurality of rays from the seed to form a surface; determining a speed function of each of the plurality of rays; evolving the surface by propagating the plurality of rays based on the speed function of each of the plurality of rays; converging the plurality of rays on a boundary of the structure; and segmenting the structure when all of the plurality of rays have converged on the structure's boundary.

According to still another aspect of the invention, a system for segmenting structures from three-dimensional (3D) images is provided. The system includes an input device for receiving 3D image data; a display device for visualizing the 3D image data; a cursor control device for selecting a structure in the 3D image data by placing a seed in the structure; and a processor for segmenting the structure from the 3D image data. The processor initializes a plurality of rays from the seed to form a surface, determines a speed function of each of the plurality of rays, evolves the surface by propagating the plurality of rays based on the speed function of each of the plurality of rays, converges the plurality of rays on a boundary of the structure, and segments the structure when all of the plurality of rays have converged on the structure's boundary. Furthermore, the cursor control device is a mouse and a user places the seed in the structure by clicking on the structure.

BRIEF DESCRIPTION OF THE DRAWINGS

The above and other objects, features, and advantages of the present invention will become more apparent in light of the following detailed description when taken in conjunction with the accompanying drawings in which:

FIGS. 1(a), 1(b) and 1(c) are several views illustrating a method for segmenting medical structures using ray propagation in accordance with the present invention, where FIG. 1(a) is a view of a CT image of a human torso containing an aneurysm indicated by an arrow, FIG. 1(b) is a view of the detected aneurysm blended with the original data, and FIG. 1(c) is a view of the segmented aneurysm;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

The present invention provides an efficient, robust, and user-friendly method for the interactive segmentation of 3D medical structures, e.g., aneurysms, from contrast enhanced CT or MR data. The primary innovation of the method is the boundary propagation by mean-shift analysis combined with a smoothness constraint. As a result, the method of the present invention is robust to both (1) outliers in the data and (2) missing data structures, e.g., surfaces that are not well defined or missing. The first property is guaranteed by a mean-shift procedure, while the second is obtained through the use of a priori information on boundary smoothness. Furthermore, due to the method's computationally efficient framework based on ray propagation, the entire process is fast, allowing real-time user interaction (under 10 seconds on a Penthium III 1 Ghz computer platform).

FIG. 1 summarizes a visualization of the method of the present invention. FIG. 1(a) illustrates an original Contrast Enhanced CTA (CE-CTA) image in multi-planar reformats (MPRs) and volume rendering. This data set contains an aneurysm which is indicated by an arrow. In addition, MPRs (orthogonal views) are centered on this pathology. A system embodying the method of the present invention allows a radiologist to quickly detect pathologies from different visualizations. The next step is the quantification of these pathologies. The goal of this method is to provide a mechanism such that a user can quickly measure the volume of blob-like structures by simply clicking on them. In this example, the user clicks on the area of interest, e.g., the aneurysm, and the 3D ray propagation algorithm detects the boundary of the structure and computes its volume. FIG. 1(b) illustrates the detected aneurysm (lumen boundary) blended with the original data and FIG. 1(c) illustrates the segmented aneurysm (lumen boundary).

The invention is particularly illustrated with reference to data generated by an X-ray computed tomography processes, but can likewise be applied to any other medical 3D image data, including data generated by magnetic resonance imaging (NRI), positron emission tomography, ultrasound imaging, etc.

Figure 2:
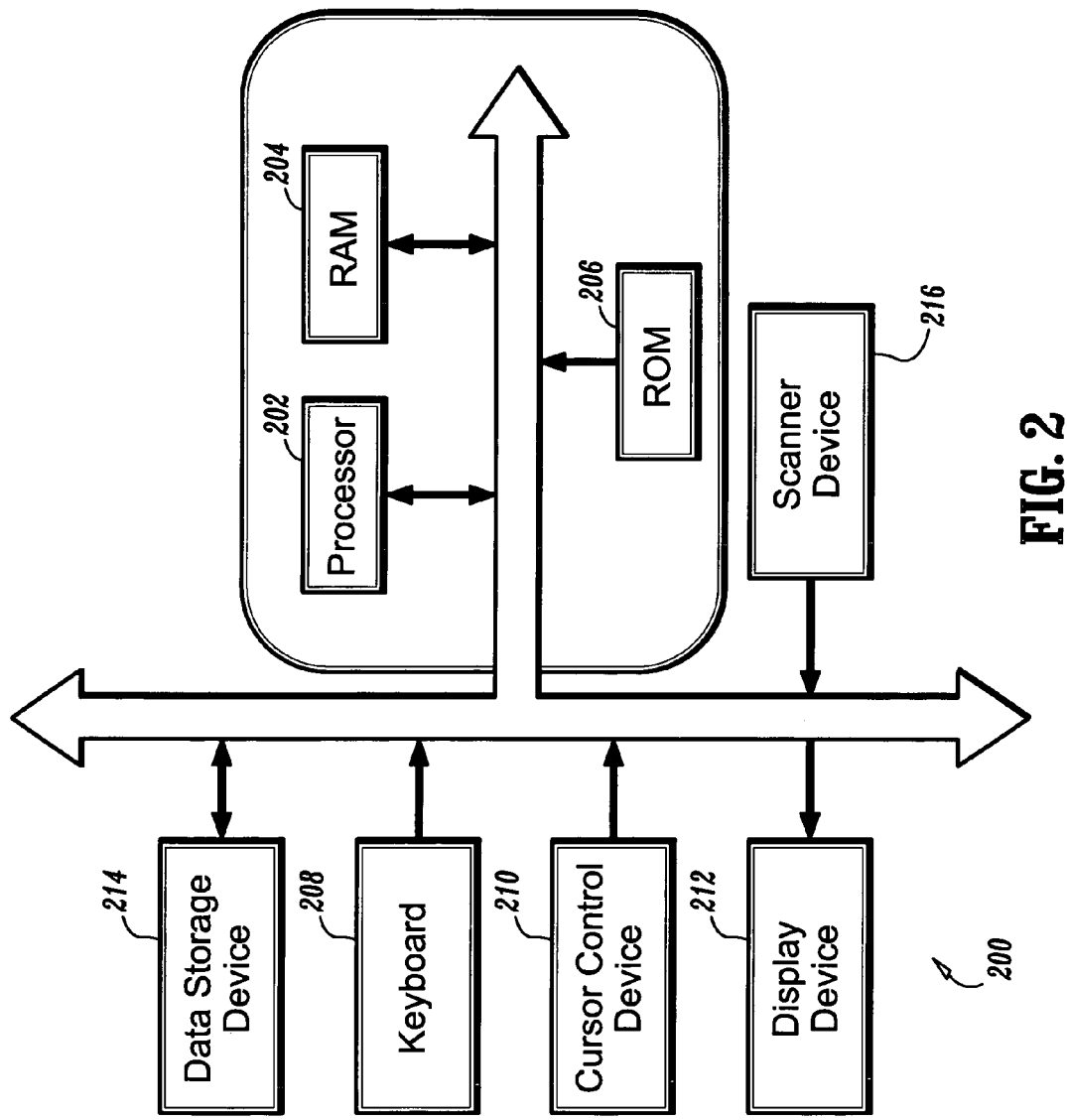
FIG. 2 is a block diagram of an exemplary system for segmenting medical structures using ray propagation in accordance with the present invention.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture such as that shown in FIG. 2. Preferably, the machine 200 is implemented on a computer platform having hardware such as one or more central processing units (CPU) 202, a random access memory (RAM) 204, a read only memory (ROM) 206 and input/output (I/O) interface(s) such as keyboard 208, cursor control device (e.g., a mouse) 210 and display device 212. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device 214 and a printing device. Furthermore, a scanner device 216, for example an X-ray machine or MRI machine, may be coupled to the machine 200 for collecting image data.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
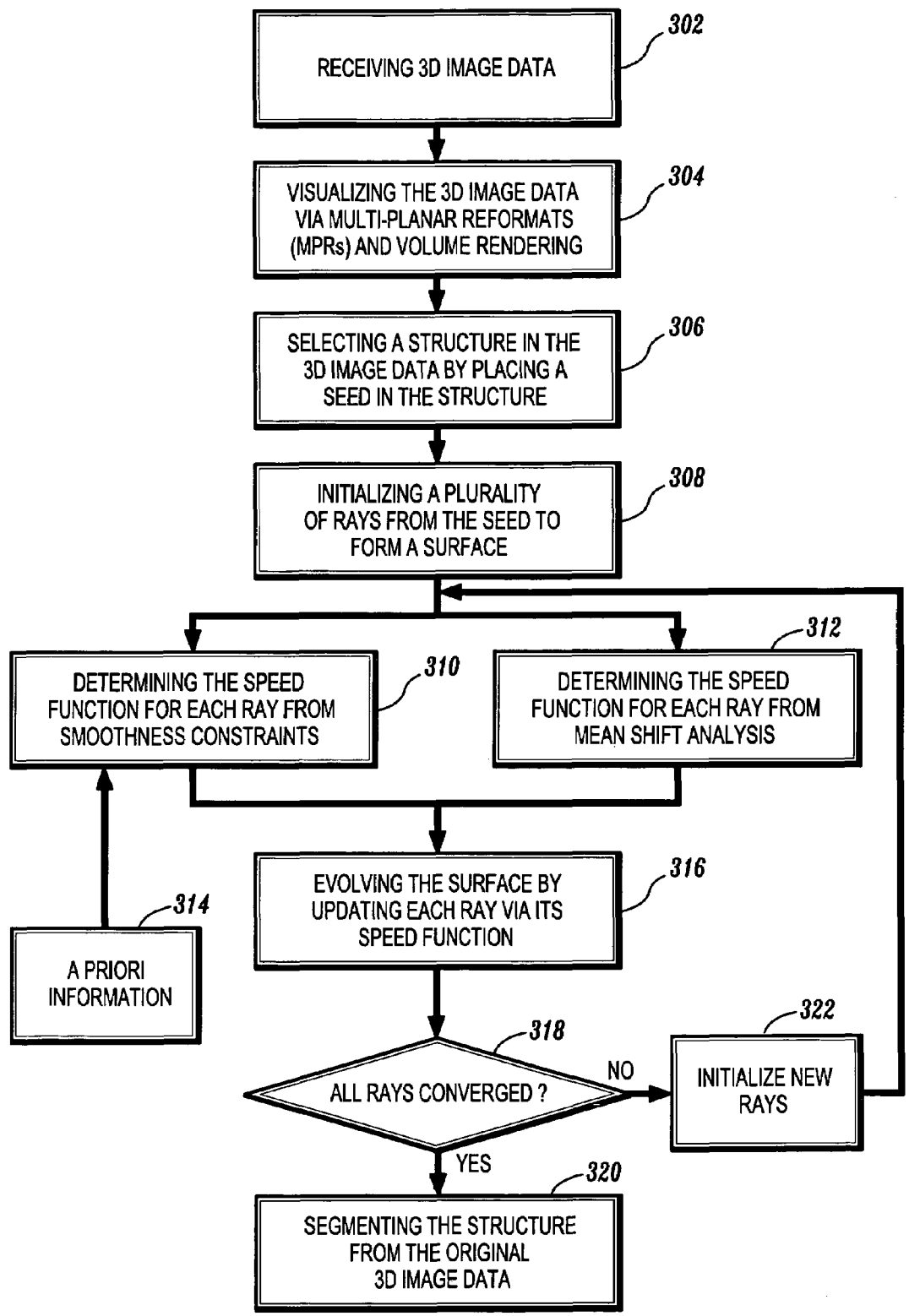
FIG. 3 is a flowchart illustrating the method for segmenting medical structures using ray propagation in accordance with the present invention.

Referring to FIG. 3, a method for segmenting 3D medical structures is presented. Initially, 3D image data is collected (Step 302) by the various means described above, e.g., X-rays, MRI, etc. Once the 3D image data has been received, the 3D image data is visualized via multi-planar reformats (MPRs) and volume rendering (Step 304), as illustrated in FIG. 1(a), on a display device such as a monitor. Within the segmentation method of the present invention, a user specifies a structure to be segmented by placing a single seed inside it, e.g., by clicking on the medical structure with a mouse or any other known cursor control device (Step 306). A boundary surface is then automatically generated via propagation of rays from the seed point (Step 308).

The propagation is guided by image forces defined through mean-shift analysis (Step 312) and smoothness constraints (Step 310). The gradient-ascent mean-shift localizes edges of the structure accurately in the presence of noise and provides good computational performance, being based on local operators, i.e., operators that use information only from its small neighborhood in computations, thus avoiding extensive computations if a quantity is computed several times for each voxel. Preferably, the method employs a mean curvature for the smoothness constraint, however, other geometric smoothing techniques, such as the mean-Gaussian curvature, as is known in the art, can be applied. The smoothness constraint process (Step 310) is influenced by a priori knowledge of medical structures (Step 314).

The boundary surface is evolved by updating the speed function of each of the rays (Step 316) as described above, i.e., by mean-shift analysis and applying smoothness constraints (Step 310). The surface is evolved until all the rays converge on the boundary surface of the structure to be segmented (Step 318). Otherwise, new rays are initialized and propagated to the boundary surface (Step 322). Once all the rays have converged, the structure is defined and can be segmented from the original 3D image data (Step 320).

Additionally, once the structure has been segmented, physical dimensions of the structure and its volume can be determined.

The development of the method of the present invention will now be described below in detail.

1. Deformable Surfaces for 3D Volume Segmentation

Deformable model-based segmentation algorithms can be divided into explicit methods and implicit methods based on how the deformable surface is represented. In explicit methods, deformable surfaces are represented by triangular mashes, superquadrics, and other complex shapes. In implicit methods, the popular choice for deformable surface representation is the level set method. Level set methods have been popular because they are topologically flexible and can represent complex shapes without any computationally expensive reparametrization step. One of the main shortcomings of level set methods is the computational complexity due to the additional embedded surface requirement for simulations. To overcome the complexity, narrow band level set evolutions have been proposed. However, these methods are still not fast enough for real-time volume segmentation. Similarly, fast marching methods have been proposed for simulating the monotonically advancing front, e.g., a surface. This fast marching method does not require any additional surface, but it is limited to simulate one directional flows, i.e., no curvature smoothing, thus its use in segmentation is rather limited. Thus, the method of the present invention employs ray propagation for fast image segmentation.

1.1 Ray Propogation

Let the front be represented by a 3D surface $\psi(\xi, \eta, t)=(x(\xi,\eta,t),y(\xi,\eta,t),z(\xi,\eta,t))$ where x,y and z are the Cartesian coordinates, $\xi$, $\eta$ parameterize the surface and t is time. The front evolution is governed by $$\begin{cases} \frac{\partial \psi(s,t)}{\partial t} = S(x,y,z)N \\ \psi(\xi,\eta,0) = \psi_0(\xi,\eta) \end{cases} \quad (1)$$

where $\psi_0(\xi,\eta)=(x(\xi,\eta,0),y(\xi,\eta,0),z(\xi,\eta,0))$ is the initial surface, and N is the unit normal vector and S(x,y,z) is the speed of a ray at point (x,y,z).

The method of the present invention is based on explicit front propagation via normal vectors. The contour is sampled and the evolution of each sample is followed in time by rewriting the Eikonal equation in vector form, namely, $$\begin{cases} x_t = S(x,y,z)\frac{N_x}{\|N\|} \\ y_t = S(x,y,z)\frac{N_y}{\|N\|} \\ z_t = S(x,y,z)\frac{N_z}{\|N\|} \end{cases} \quad (2)$$

This evolution is the Lagrangian solution since the physical coordinate system moves with the propagating wavefront.

In general, the applications of ray propagation for surface evolution have been limited. Since the normals to the wavefront may collide (formation of shocks), this approach exhibits numerical instabilities due to an accumulated density of sample points, thus requiring special care, such as reparametrization of the wavefront. Also, topological changes are not handled naturally, an external procedure being required.

The method of the present invention employs ray propagation from a single point source for the segmentation of blob-like structures found in medical images, such as aneurysm and brain tumors. In fact, ray propagation is well suited since it is very fast, no topological changes are necessary and no shocks form during the propagation, and rays from a single source point do not collide with each other.

Observe that the speed function S(x,y,z) plays an important role in the quality of the segmentation results. In the method of the present invention, the speed of rays, S(x,y,z), depends on image information and shape priors. Specifically, the method uses $$S(x,y,z)=S_0(x,y,z)+\beta S_1(x,y,z) \quad (3)$$

where $S_0(x,y,z)$ measures image discontinuities, $S_1(x,y,z)$ represents shape priors, and a constant, $\beta$, balances these two terms where $\beta$ ranges from 0 for no smoothing to 1 for a large amount of smoothing.

1.2 Robust Measure of Discontinuities: Mean-Shift Analysis

Traditionally, image gradients are used to guide deformable models to object boundaries. However, the image gradient is not robust to noise, and outliers in the data can significantly influence the result. A solution to this problem is to use robust measures of discontinuities.

The method of the present invention is based on a representation of image data which uses kernel density estimation as disclosed in D. Comaniciu, P. Meer: *"Mean Shift: A Robust Approach toward Feature Space Analysis"*, IEEE Trans. Pattern Analysis Machine Intell., Vol. 24, No. 5, 603–619, 2002, the contents of which are incorporated by reference. Consider a 1-dimensional intensity profile, e.g., a ray, obtained from a gray level image. Each pixel along the ray is characterized by a location x and an intensity value I. As a result, an input ray of N pixels is represented as a collection of 2-dimensional points $\{x_i, I_i\} i=1, \ldots, N$. The 2-dimensional space constructed is called the joint spatial-intensity domain. Note that this construction generalizes for standard gray-level image data (3-dimensional space with 2 dimensions for coordinates and one for intensity), color data (5-dimensional space with 2 dimensions for coordinates and three for color), multi-modal data, or image sequences.

The task of identifying image discontinuities reduces to the partitioning of the joint space according to the probability density estimated in this space. The number of segments, i.e., intervals in a density graph, is determined by the number of peaks (modes) of the underlying density. The iterative mean-shift procedure is used to find the modes in the joint space and assign each data point to a mode in its neighborhood. Denote by $\{x^*_i, I^*_i\}$ the mode associated to $\{x_i, I_i\}$ where $i=1, \ldots, N$. Since the modes delineate regions with high concentration of similar data, the robustness to outliers is guaranteed.

Let $\{d_i = x^*_i - x_i\} i=1, \ldots, N$ be the oriented spatial distance from a point to its assigned mode. (Hereinafter, this quantity will be referred to as the displacement vector.) The displacement vectors always point away from discontinuities and play a dominant role in the propagation technique. The iterative, mean-shift-based algorithm for finding the displacement vectors is For each i=1, ..., N
1. Initialize k=1 and $(x^k_i, I^k_i, d_i)=(x_i, I_i, 0)$ where k is the discrete time, iteration number
2. Compute $$X_i^{k+1} = \frac{\sum_{j=1}^{M} x_j e^{\frac{-(x_i^k-x_j)^2}{2\sigma_x^2}} \cdot e^{\frac{-(I_i^k-I_j)^2}{2\sigma_I^2}}}{\sum_{j=1}^{M} e^{\frac{-(x_i^k-x_j)^2}{2\sigma_x^2}} e^{\frac{-(I_i^k-I_j)^2}{2\sigma_I^2}}} \quad (4)$$

$$I_i^{k+1} = \frac{\sum_{j=1}^{M} I_j e^{\frac{-(x_i^k-x_j)^2}{2\sigma_x^2}} e^{\frac{-(I_i^k-I_j)^2}{2\sigma_I^2}}}{\sum_{j=1}^{M} e^{\frac{-(x_i^k-x_j)^2}{2\sigma_x^2}} e^{\frac{-(I_i^k-I_j)^2}{2\sigma_I^2}}}$$

until convergence.
3. Assign $(x^*_1, I^*_i)=(x_i^{k+1}, I_i^{k+1})$
4. Assign $d_i=(x^*_i, -x_i)$ wherein $\sigma_x$ and $\sigma_I$ are the bandwidths of Gaussian kernels in the spatial and intensity domain, respectively.

The first part of the speed term can be now defined by $$S_o(x, y, z) = \frac{f(x, y, z)}{1.0 + |\nabla d(x, y, z)|^2}. \quad (5)$$

The function d(x,y,z) is obtained by summarizing the information provided by the displacement vectors. For a given location along a ray, d(x,y,z) is positive when the corresponding displacement vector is pointing outbound and negative when the vector points towards the seed point. The term f(x,y,z) is given by $$f(x, y, z) = \begin{cases} -\text{sign}(d(x, y, z)) & \text{if } |\nabla d(x, y, z)| < \text{threshold} \\ 1 & \text{else} \end{cases} \quad (6)$$

where the gradient of d(x,y,z), namely $\nabla d(x, y, z)$ is computed along the ray. If an absolute value of the gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary. If an absolute value of a gradient of the displacement vector of the individual ray is less than a predetermined value, the individual ray is propagated from the seed to the boundary. In this formulation, rays propagate freely towards the object boundaries when they are away from them and slow down in the vicinity of boundaries. If a ray crosses over a boundary, it returns to the boundary. The parameter threshold is determined from statistical measures computed from the density function of displacement errors. It is assumed that locations of small gradients (less than threshold) in the displacement function are not part of any object.

1.3 Smoothness Constraints

Problems related to missing data, e.g., noise, data corruption, etc., are common in the segmentation of medical structures. A solution to missing data is to exploit a priori knowledge by imposing smoothness constraints on the evolving surface. We use two types of smoothness constrains in this method, one on the speed of neighboring rays, the other on the local curvature of the front.

Thus, the speed function $S_0$ (x,y,z) of a ray is filtered by employing the speed information in a neighborhood. In addition, the speed term, $S_1$ (x,y,z) imposes the smoothness of the front by employing the mean curvature given by $$S_1(x, y, z) = \frac{K_1 + K_2}{2}$$

where $K_1$ and $K_2$ are the principal curvatures. However, other geometric smoothing techniques, such as the conventional Mean-Gaussian curvature can be used.

1.4 Implementation

For the initialization of rays, the method of the present invention uses an algorithm that provides an approximation to equidistant placement of points on a sphere by employing several subdivisions of an octahedron. The octahedron is initialized with the six points (1,0,0), (−1,0,0), (0,1,0), (0,−1,0) (0,0,1) and (0,0,−1) and connections between neighboring points give the first primitive triangulization of the unit sphere. In the subdivision process, each triangle is subdivided into four new ones by placing one new point on the middle of every edge, projecting it onto the unit sphere and connecting the neighboring points. Rays are then shot from the seed point along the direction given by this approximation of the unit sphere. Observe that in the initial propagations, a small number of rays are necessary. However, when the distance of rays from the seed point becomes large the distance between rays also becomes large, as well. This corresponds to each triangle occupying a larger region. In this implementation, when a triangle becomes greater than a predetermined size, i.e., the spatial distance between endpoints of two neighboring rays becomes greater than a predetermined size, it is again subdivided into four new ones by placing one new ray on the middle of every edge (i.e., initializing a new ray between the two neighboring rays), projecting it onto the unit sphere and connecting the neighboring points.

To estimate the surface curvature at the current position of a ray, the method uses the following algorithm: Compute the first matrix S $$S = \left(\frac{1}{2N} \sum_{i=1}^{N} n_i n_i^t\right) + \frac{1}{2} t \quad (7)$$

where N is the number of neighbors, $n_i$ denotes the vector to the current position of the i-th neighbor and p is the vector to the current position of the ray in question. The positive definite matrix S is called structure tensor or scatter matrix. A principle component analysis provides the eigenvalues $\sigma_1, \mu \sigma_2, \mu \sigma_3$ and eigenvectors $v_1$, $v_2$, $v_3$ of S. The eigenvector $v_1$ corresponding to the largest eigenvalue $\sigma_1$ is in normal tangential direction. The other two eigenvectors point into the directions of the principal curvatures. Though the corresponding eigenvalues $\textcircled{9}_2$ and $\textcircled{9}_3$ already give an estimate of the degree of curvature in these directions, they do not give information of their orientation. Therefore, for every neighbor the method also calculates the dot product of the neighbor vector and the principal curvature vector. This coefficient is then multiplied with the difference of $$\frac{\pi}{2}$$

and the angle between the normal tangential vector $v_1$ and the vector connecting p and the neighbor. The sum over this weighted angle differences is positive for convex areas and negative for concave areas. Hence, the final formulas for principal curvatures are:

$$K_1 = \sum_{i=1}^{N} \frac{|v_2 \cdot n_i|}{|v_2||n_i|} \left( \arccos\left(\frac{v_i \cdot (n_i - p)}{|v_1||n_i - p|}\right) - \frac{\pi}{2} \right) \quad (8)$$

$$K_2 = \sum_{i=1}^{N} \frac{|v_3 \cdot n_i|}{|v_3||n_i|} \left( \arccos\left(\frac{v_i \cdot (n_i - p)}{|v_1||n_i - p|}\right) - \frac{\pi}{2} \right). \quad (9)$$

where $K_1$ is the minimum bending characteristic of the curvature and $K_2$ is the maximum bending characteristic of the curvature. $K_1$ and $K_2$ are then averaged to get the mean curvature.

The present invention provides a user-friendly 3D volume segmentation method. The segmentation method is very fast due to ray propagation. Second, the analysis based on mean-shift makes the method robust to outliers inherent in CT and MR images. Third, the use of shape priors, such as smoothness constraints, implies a reduced sensitivity of the method to missing data, i.e., surfaces that are not well defined or missing. Fourth, the method is user-friendly since one-click inside the 3D medical structure is often sufficient.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for segmenting structures from three-dimensional (3D) images, the method comprising the steps of:
    receiving 3D image data;
    visualizing the 3D image data on a display device;
    selecting a structure in the 3D image data by placing a seed in the structure;
    initializing a plurality of rays from the seed to form a surface;
    determining a speed function of each of the plurality of rays;
    evolving the surface by propagating the plurality of rays based on the speed function of each of the plurality of rays, including performing a mean-shift analysis on each of the plurality of rays to identify image discontinuities, the image discontinuities defining the structure's boundary, said analysis including determining a joint spatial-intensity domain for each of the plurality of rays, the joint spatial-intensity domain including for each pixel along each of the plurality of rays at least one location value and at least one intensity value, partitioning the domain to identify the discontinuities based on a probability density, and determining a displacement vector for each of the plurality of rays, the displacement vector being a distance between a point on an individual ray and a convergence point on the individual ray;
    converging the plurality of rays on a boundary of the structure; and
    segmenting the structure when all of the plurality of rays have converged on the structure's boundary.

2. The method of claim 1, further comprising the step of determining a volume of the segmented structure.

3. The method as in claim 1, wherein if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary.

4. The method as in claim 1, wherein if an absolute value of a gradient of the displacement vector of the individual ray is less than a predetermined value, the individual ray is propagated from the seed to the boundary.

5. The method as in claim 1, wherein the evolving the surface step includes applying a smoothness constraint to the evolving surface.

6. The method as in claim 5, wherein the applying a smoothness constraint includes filtering the speed function of an individual ray of the plurality of rays based on a neighboring ray.

7. The method as in claim 5, wherein the applying a smoothness constraint includes imposing a mean curvature on the evolving surface based on shape priors.

8. The method as in claim 1, wherein during the evolving step, if a spatial distance between any two neighboring rays of the plurality of rays becomes greater than a predetermined distance, an additional ray is initialized between the two neighboring rays.

9. The method as in claim 1, wherein the selecting step includes clicking on the structure with a computer mouse.

10. A program storage device readable by a machine, tangibly embodying a program of instructions executable by the machine to perform method steps for segmenting structures from three-dimensional (3D) images, the method steps comprising:
    receiving 3D image data;
    visualizing the 3D image data on a display device;
    selecting a structure in the 3D image data by placing a seed in the structure;
    initializing a plurality of rays from the seed to form a surface;
    determining a speed function of each of the plurality of rays;
    evolving the surface by propagating the plurality of rays based on the speed function of each of the plurality of rays including performing a mean-shift analysis on each of the plurality of rays to identify image discontinuities, the image discontinuities defining the structure's boundary, said analysis including determining a joint spatial-intensity domain for each of the plurality of rays, the joint spatial-intensity domain including for each pixel along each of the plurality of rays at least one location value and at least one intensity value, partitioning the domain to identify the discontinuities based on a probability density, and determining a displacement vector for each of the plurality of rays, the displacement vector being a spatial distance between a point on an individual ray and a convergence point on the individual ray;

converging the plurality of rays on a boundary of the structure; and segmenting the structure when all of the plurality of rays have converged on the structure's boundary.

11. The program storage device of claim 10, further comprising the step of determining a volume of the segmented structure.

12. The program storage device as in claim 10, wherein if an absolute value of a gradient of the displacement vector of the individual ray is greater than a predetermined value and a sign of the displacement vector is negative, the individual ray is propagated from the seed to the boundary, and if the absolute value of the gradient of the displacement vector of the individual ray is greater than a predetermined value and the sign of the displacement vector is positive, the individual ray is propagated from outside the boundary toward the boundary.

13. The program storage device as in claim 10, wherein if an absolute value of a gradient of the displacement vector of the individual ray is less than a predetermined value, the individual ray is propagated from the seed to the boundary.

14. The program storage device as in claim 10, wherein the evolving the surface step includes applying a smoothness constraint to the evolving surface.

15. The program storage device as in claim 14, wherein the applying a smoothness constraint includes filtering the speed function of an individual ray of the plurality of rays based on a neighboring ray.

16. The program storage device as in claim 14, wherein the applying a smoothness constraint includes imposing a mean curvature on the evolving surface based on shape priors.

* * * * *